Sept. 15, 1936.  W. O. BECHMAN  2,054,534
CYLINDER HEAD AND HEAT CONTROL VALVE STRUCTURE
Filed Aug. 9, 1935  2 Sheets-Sheet 1

Inventor
William O. Bechman
By V. F. Larraque
Atty.

Sept. 15, 1936.  W. O. BECHMAN  2,054,534
CYLINDER HEAD AND HEAT CONTROL VALVE STRUCTURE
Filed Aug. 9, 1935  2 Sheets-Sheet 2

Inventor
William O. Bechman
By V. F. Lassagne
Atty.

Patented Sept. 15, 1936

2,054,534

UNITED STATES PATENT OFFICE 2,054,534

CYLINDER HEAD AND HEAT CONTROL VALVE STRUCTURE

William O. Bechman, Chicago, Ill., assignor to International Harvester Company, a corporation of New Jersey Application August 9, 1935, Serial No. 35,417

5 Claims. (Cl. 123—122)

This invention relates to an internal combustion engine. More specifically it relates to a cylinder head construction embodying means for supplying heat from the exhaust gas to the incoming charge.

In the operation of internal combustion engines, it has been common practice, by means of various types of heat exchange devices, to heat the incoming charge by the sensible heat of the hot exhaust gases. In engines utilizing manifolds, hot spot arrangements have been employed for heating certain portions of the inlet manifold. To regulate the supply of heat for different fuels and different operating conditions, valve means have been provided to divert only the required amount of exhaust gas into heat exchange relationship with the inlet manifold.

The present invention has for its principal object a novel and simplified heat control for the charges of internal combustion engines. Another principal object is the provision of a charge heating construction adapted to be formed closely associated with an intake and outlet valve. Another object is to provide a heat control device particularly designed for single cylinder valve-in-head engines, the control device being constructed with the head and regulated from outside the head. These objects and others, which will be apparent from the detailed description to follow, are accomplished by a construction such as shown in the drawings, in which:

Figure 1:
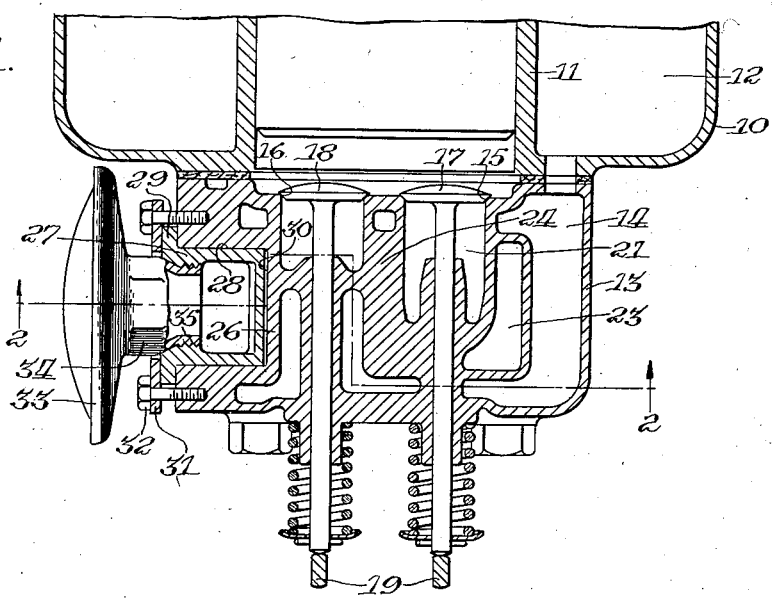
Figure 1 is a cross section taken through the valves, showing the head and a portion of the block of a single cylinder engine.

The invention has been illustrated as embodied in a single cylinder internal combustion engine. The engine block 10 is provided with a cylinder 11 and a water circulating jacket 12. A valve-in-head cylinder head 13 is secured to the block 10. The head contains a water circulating jacket 14, which is in communication with the water jacket 12.

The cylinder head 13 is provided with an inlet port 15 and an exhaust port 16. Said ports are formed with valve seats for an inlet valve 17 and an exhaust valve 18 provided with stems which extend through the cylinder head for operation by rocker arms 19. The usual compression springs are provided for maintaining the valves in seated position except when opened by the rocker arms 19.

Figure 2:
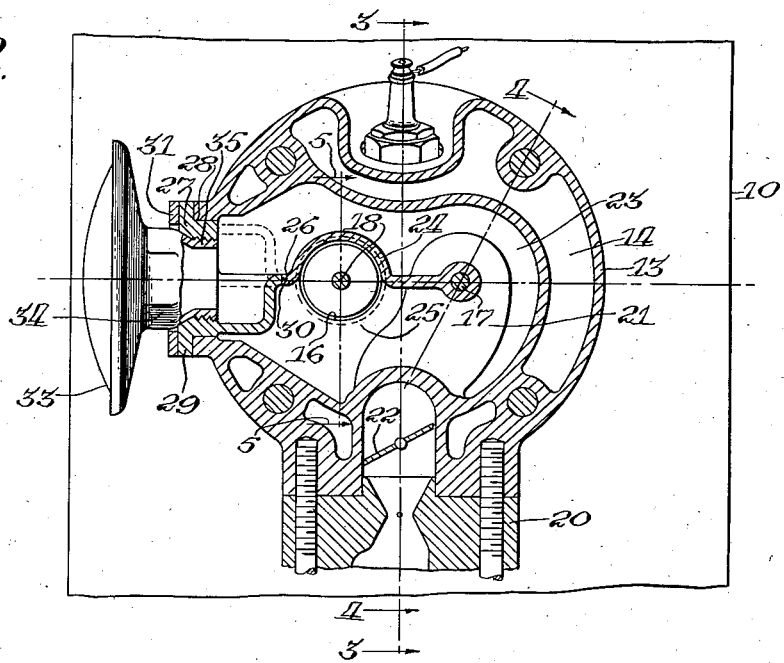
Figure 2 is a section taken on the line 2—2 of Figure 1.
Figure 3:
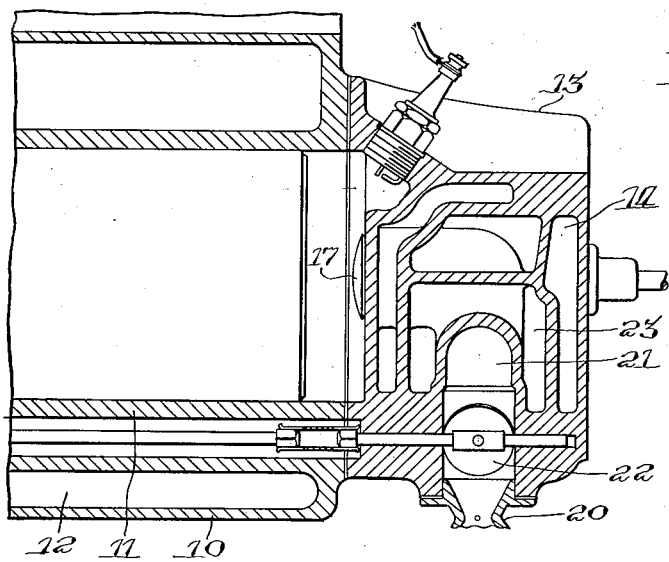
Figure 3 is a section taken on the line 3—3 of Figure 2.
Figure 4:
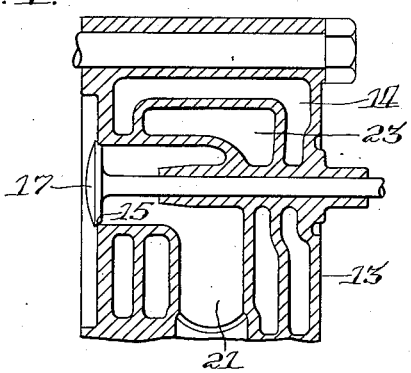
Figure 4 is a section taken on the line 4—4 of Figure 2.
Figure 6:
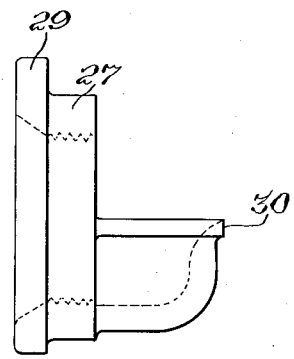
Figure 6 is an enlarged elevation of the exhaust valve outlet and control member.

In Figure 2 a portion of a simple carbureting system is illustrated by the member 20, which is formed with a Venturi throat for supplying a fuel charge to an inlet conduit 21 cored in the cylinder head communicating with the inlet port 15. A throttle valve 22 is shown for regulating the supply of mixture to the engine.

Figure 5:
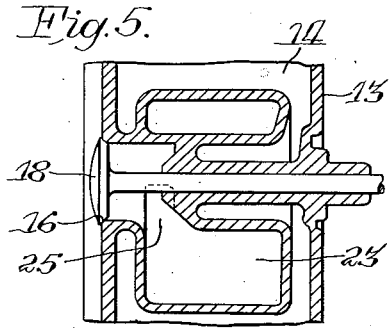
Figure 5 is a section taken on the line 5—5 of Figure 2.

An exhaust gas chamber 23 is cored in the cylinder head surrounding the inlet conduit 21 and the exhaust port 16. A baffle wall 24 extending around a portion of the exhaust port 16 and over to the valve guide of the inlet valve divides the exhaust gas chamber 23 into two passages communicating with each other at each end. As best shown in Figure 5, the exhaust gas port 16 communicates with the exhaust gas chamber 23 by means of a semi-cylindrical throat 25. This construction is utilized in order to bring the valve stem guide down as close to the valve head as possible, whereby a cooling water jacket may be provided around the valve stem guide.

The division wall 24 terminates in an edge portion 26 parallel to the axes of the valves. This edge portion can be seen clearly in Figures 1 and 2. An exhaust gas outlet and heat control member 27 is fitted into a cylindrical bore 28, the axis of which lies in a plane passing through the stems of the valves, as indicated by the center line shown in Figure 2. The member 27 is provided with a flange 29, which seats on a corresponding surface formed around the bore 28 on the cylinder head 13. Inside the exhaust gas chamber 23, the member 27 is formed with what may be best termed a half cup, slightly less than half of which is cut away. This cup is formed with an edge portion 30 adapted in one position of adjustment to align with the edge portion 26. These two edge portions are machined or otherwise constructed to form a substantially gas-tight fit, although the passage of a small amount of gas is of no consequence.

The member 27 is angularly adjustable for rotating the portion within the exhaust gas chamber 23 into the dotted line position shown in Figure 2, or into any intermediate position between the position shown and the dotted position. An annular member 31, provided with openings through which cap screws 32 extend, provides means for clamping the member 27 securely in position. A muffler 33 provided with a polygonal shoulder 34 and a threaded extension 35 is threaded into the member 27.

The operation of the heat control device constituting this invention will be obvious from the description given above. With the control member 27 in the position shown in Figure 2, exhaust gas passes through the exhaust port 16 upon opening the exhaust valve through the passage 25, down one side of the exhaust gas chamber 23, around the inlet conduit 21, down the other side of the exhaust gas chamber 23, out through the open side of the member 27, and through the muffler 33 into the atmosphere. With the control member 27 in this position, the maximum amount of heat is supplied to the incoming charge passing through the inlet conduit 21. This position of adjustment is used for fuels having low volatility and for extremely low temperatures. For more volatile fuels and for higher temperatures it is undesirable to apply the maximum amount of heat to the incoming charge, as excess heat lowers the volumetric efficiency of the engine. The supplying of more heat than is necessary also causes the engine to run hotter and pass the additional load on the cooling system.

When less heat is necessary to properly condition the incoming charge, the cap screws 32 are loosened and the muffler 33 is rotated, carrying with it the control member 27. Said member may be moved to the extreme position, as shown in dotted lines in Figure 2, or to any intermediate position. In the extreme position there is a direct current of exhaust gas around the inlet conduit 21, only such heat being supplied to said conduit as is obtained by turbulence of the exhaust gas. This condition is used for high temperature operation and for ordinary temperatures using a volatile fuel. Intermediate positions may be utilized as found desirable. Gaskets may be used to prevent leakage around the member 27, if found necessary. Under some conditions a construction may be used in which the control member may be adjusted without loosening the securing means.

It is to be understood that applicant has shown and described only a preferred embodiment of his charge heating device as particularly adapted for water cooled single cylinder engines. It is to be understood that he contemplates as his invention all modifications that fall within the scope of the appended claims.

What is claimed is:

1. In an internal combustion engine and in combination therewith, a cylinder head formed with an inlet port and an outlet port, an inlet conduit in communication with the inlet port, an exhaust gas chamber surrounding a portion of the inlet conduit and communicating with the exhaust port, and an exhaust gas outlet member communicating with the exhaust gas chamber, said member being rotatably mounted for adjustment and including baffle means for directing the flow of exhaust gas around the inlet conduit for supplying heat thereto in regulated amounts.

2. In an internal combustion engine and in combination therewith, a cylinder head formed with an inlet port and an exhaust port, inlet and exhaust valves mounted in said head for controlling said ports, an inlet conduit cored in the head and being in communication with the inlet port, an exhaust gas chamber formed in the head and extending around a portion of the inlet conduit, said chamber being in communication with the exhaust port, an exhaust gas outlet conduit communicating with the exhaust gas chamber, and baffle means carried by said member within the cylinder head for directing exhaust gas into contact with the inlet conduit.

3. A device as set forth in claim 2, in which the exhaust gas outlet member is rotatably mounted whereby the heat supplied to the inlet conduit may be regulated by angular movement of said member.

4. In an internal combustion engine and in combination therewith, a cylinder head formed with an inlet port and an outlet port, an inlet conduit in communication with the inlet port, an exhaust gas chamber surrounding a portion of the inlet conduit and communicating with the exhaust port, said chamber being formed with a cylindrical outlet portion, and a flanged exhaust gas outlet and flow control member rotatably fitted in said outlet portion, said member being provided with a flow directing baffle within the exhaust gas chamber whereby angular adjustment of said member regulates the flow of exhaust gas in contact with the inlet conduit.

5. In a single cylinder internal combustion engine and in combination therewith, a cylinder head provided with inlet and outlet ports controlled by parallel intake and exhaust valves, an inlet conduit cored in the head communicating with the inlet port, an exhaust chamber cored in the head and surrounding the inlet port and a portion of the inlet conduit, said chamber communicating with the exhaust port on one side of a plane through the centers of the two valves, a division wall formed in the head between the two valves thereby dividing the exhaust gas chamber into two passageways communicating with each other at each end, said chamber being provided with an outlet formed by a bore having its axes lying in the plane of the valve stems, an exhaust gas outlet and control member fitted in said bore and provided with a semi-cupped extension lying within the exhaust gas chamber and abutting the division wall, said member being rotatable to bring the open side of the cup into communication with either passageway of the chamber whereby the flow path of exhaust gas is controlled.

WILLIAM O. BECHMAN.